(12) United States Patent
Feng

(10) Patent No.: US 8,071,936 B2
(45) Date of Patent: Dec. 6, 2011

(54) OPTICAL SENSING DEVICE

(75) Inventor: Chung-Ping Feng, Taipei Hsien (TW)

(73) Assignee: Edison Opto Corporation, Taipei Hsien (TW)

( * ) Notice: Subject to any disclaimer, the term of this patent is extended or adjusted under 35 U.S.C. 154(b) by 322 days.

(21) Appl. No.: 12/539,711

(22) Filed: Aug. 12, 2009

(65) Prior Publication Data

US 2011/0036972 A1    Feb. 17, 2011

(51) Int. Cl.
*H01J 40/14*    (2006.01)
*G08B 21/00*    (2006.01)
(52) U.S. Cl. ............ 250/239; 250/551; 250/231.1; 73/1.75; 340/689
(58) Field of Classification Search .......... 250/239, 250/551, 231.1, 231.11; 73/1.75, 1.78, 1.41; 356/138, 222, 614; 340/686.1, 689
See application file for complete search history.

(56) References Cited

U.S. PATENT DOCUMENTS

2011/0128156 A1*   6/2011   Sun et al. ............... 340/689
* cited by examiner

*Primary Examiner* — Kevin Pyo
(74) *Attorney, Agent, or Firm* — Rosenberg, Klein & Lee

(57) ABSTRACT

An optical sensing device comprising a shell, at least one light emitting member, at least one optical sensing member and a shading member is disclosed. The shell is formed with a black-body condition space therein, and the light emitting member projects a light beam into the black-body condition space. The optical sensing member is located within the shell and neighboring to the black-body condition space. The shading member is movably arranged within the black-body condition space. At least one end surface of the shading member is contacted with the shell and formed with at least one recess. When the shading member moves to at least one shading region within the black-body condition space, the optical sensing member is shaded by the shading member; and when the shading member moves apart the shading region, the optical sensing member senses the light beam to accordingly send out a sensing signal.

14 Claims, 12 Drawing Sheets

OPTICAL SENSING DEVICE

FIELD OF THE INVENTION

The present invention relates to an optical sensing device, and more particularly to an optical sensing device with high sensing sensitivity.

BACKGROUND OF THE INVENTION

In daily life, it is usually necessary to use some sensor to obtaining the inclined angle or the movement data of an object. These sensors usually can provide the functions of sensing horizontal movement, vertical movement or inclined angle. Practically, many sensing technologies, such as optical sensing technologies, sound wave sensing technologies, or electrical sensing technologies, may be applied to these sensors. Among these sensing technologies, the optical sensing technologies have the advantage of rapid sensing, so that the optical sensing technologies are widely applied to manufacture some optical sensing devices with high sensing sensitivity.

Based on the background as mentioned, two representative prior arts are cited as follows for further description. Please refer to FIG. 1 to FIG. 3, wherein FIG. 1 illustrates the structure of an optical sensing device after a second shell is removed from a first shell thereof in a first prior art; FIG. 2 is a sectional view along A-A direction in FIG. 1, which illustrates the optical sensing device with the second shell assembled to the first shell thereof; and FIG. 3 illustrates the relative locations of the light emitting member, the shading member, the shading region and the optical sensing member in the first prior art.

As shown in FIG. 1 and FIG. 2, an optical sensing device 1 comprises a shell 10 including a first shell 11 and a second shell 12, and the shell 10 is formed by assembling the second shell 12 to the first shell 11. Meanwhile, the optical sensing device 1 further comprises a light emitting member 13, two optical sensing members 14, 14a and a shading member 15.

When the second shell 12 is assembled to the first shell 11, a black-body condition space BBS0 is formed between the first shell 11 and the second shell 12. In other words, the shell 10 has the black-body condition space BBS0 therein. Hereinafter, the black-body condition space implies a closed space free from being interfered by external light. The optical sensing member 14 and 14a are arranged on the bottom of the first shell 11 of the shell 10. The shading member 15 is movably arranged within black-body condition space BBS0. Moreover, the shading member 15 is a substantial cylindrical structure, which has a first radius R0 and two end surfaces 151 and 152. The end surface 151 contacts with the first shell 11 of the shell 10, and the second end surface 152 contacts with the second shell 12 of the shell 10. The end surface 151 contacts with the first shell 11 in a contact area CA0 of $\pi \cdot R0^2$, wherein $\pi$ is the ratio of the circumference of the substantial cylindrical structure to its diameter.

When the optical sensing device 1 is applied to sense the inclined angle or the movement data of an object (not shown), it is able to attach the optical sensing device 1 to the object, and make the light emitting member 13 project a light beam LB0 into the black-body condition space BBS0. The light beam LB0 is reflected by the first shell 11, the second shell 12 or the shading member 15 within the black-body condition space for many times, so as to illuminate the black-body condition space BBS0.

As shown in FIG. 3, when the object is moved or lifted along a first direction D0. The shading member 15 would surfer an inertia force or a gravity force. When the component of the inertia force or the gravity force along the surface, that the end surface 151 substantially contacts with the first shell 11, is greater than the friction force between the shading member 15 and the first shell 11, the shading member 15 would move along a second direction D0' opposite to the first direction D0.

When the shading member moves to a shading region SR0 within the black-body condition space BBS0, the optical sensing member 14 is shaded by the shading member 15. At this moment, in another shading region SR0', the optical sensing member 14a is not shaded by the shading member 15; therefore, the optical sensing member 14a still can sense the light beam LB0 to accordingly send out a sensing signal. Furthermore, when the shading member 15 moves out of the shading region SR0, the optical sensing member 14 would not be shaded by the shading member 15. At this moment, the optical sensing member 14 also can sense the light beam LB0 to accordingly send out the sensing signal.

Please refer to FIG. 4, which illustrates the relative locations of the light emitting member, the shading member and the optical sensing member in a second prior art. As shown in FIG. 4, in the second prior art, another optical sensing device 1a is applied to replace the optical sensing device 1 as mentioned above. In the optical sensing device 1a, another first shell 11a is applied to replace the first shell 11, and another second shell (not shown) matches to the first shell 11a is applied to replace the second shell 12. The second shell (not shown) is assembled to the first shell 11a to form a black-body condition space BBSa0 therein. Meanwhile, the optical sensing device 1a further comprises a light emitting member 13a, two optical sensing members 14b, 14c and the shading member 15. The relative locations of the light emitting member 13a, the shading member 15, the optical sensing member 14b and 14c are shown in FIG. 4. Due to that each element and its working principle in the second prior are similar to or the same as those in the first prior art, the related statements would not be repeated respectively.

Any person skilled in ordinary art make out that in the two cited prior arts, the contact area CA0, that the end surface 151 contacts with the first shell 11, is $\pi \cdot R0^2$; therefore, a greater friction force would exist between the shading member 15 and the first shell 11. Under this situation, when the optical sensing device 1 attaches to the object moving with less acceleration or inclined angle, the inertia force or the gravity force could not overcome the friction force between the shading member 15 and the first shell 11 to make the shading member 15 move respect to the first shell 11. In other words, the optical sensing device 1 could not sense the less movement or inclined angle of the object, and it implies that the optical sensing device 1 would provide lower sensitivity for sensing the moment data or inclined angle of the object as mentioned.

SUMMARY OF THE INVENTION

Due to that there is a serious problem of lower sensitivity in the prior arts, the primary objective of the present invention is to provide an optical sensing device to reduce the contact area between the shading member and the shell, so as to reduce the friction force between the shading member and the shell.

Means of the present invention for solving the problems as mentioned above provides an optical sensing device, which comprises a shell, at least one light emitting member, at least one optical sensing member and a shading member. The shell is formed with a black-body condition space therein, and the light emitting member projects a light beam into the black-body condition space. The optical sensing member is located within the shell and neighboring to the black-body condition space. The shading member is movably arranged within the black-body condition space. At least one end surface of the shading member is contacted with the shell and formed with at least one recess. When the shading member moves to at least one shading region within the black-body condition space, the optical sensing member is shaded by the shading member; and when the shading member moves apart the shading region, the optical sensing member senses the light beam to accordingly send out a sensing signal.

In the preferred embodiments of the present invention, the light emitting member can be a light emitting diode (LED); the optical sensing member can be a photo transistor or a photo diode; the shell can be formed by assembling a second shell to a first shell; the shading member can be a substantial cylindrical structure; and the recess can be a cylindrical shape, a cone shape, a cup shape or a curved shape recess.

Comparing with the optical sensing device as disclosed in prior arts, in the present invention, at least one recess is formed on at least one end surface contacted with the shell; therefore, it is effective to reduce the contact area between the shading member and the shell, so as to effectively reduce the friction force between the shading member and the shell. It is more important that the sensitivity of the optical sensing device for the sensing movement data and inclined angle of the object can be greatly improved via reducing the friction force between the shading member and the shell.

The devices, characteristics, and the preferred embodiment of this invention are described with relative figures as follows.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

The optical sensing device as provided in accordance with the present invention can be widely applied to sense the movement data or the inclined angle of many kinds of objects, and the combined applications of the present invention are too numerous to be enumerated and described, so that only five preferred embodiments are disclosed as follows for representation.

Figure 1:
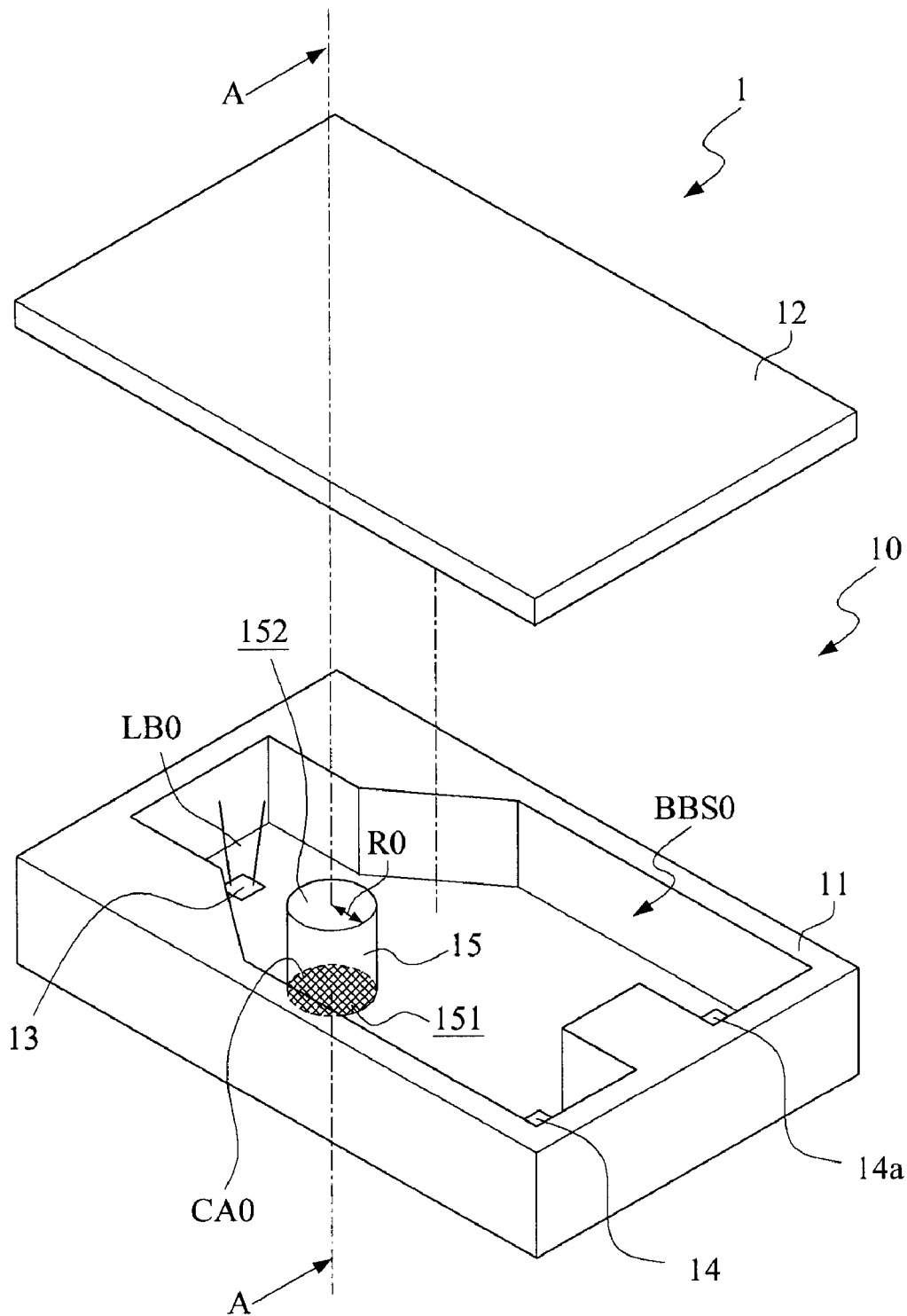
FIG. 1 illustrates the structure of an optical sensing device after a second shell is removed from a first shell thereof in a first prior art.
Figure 2:
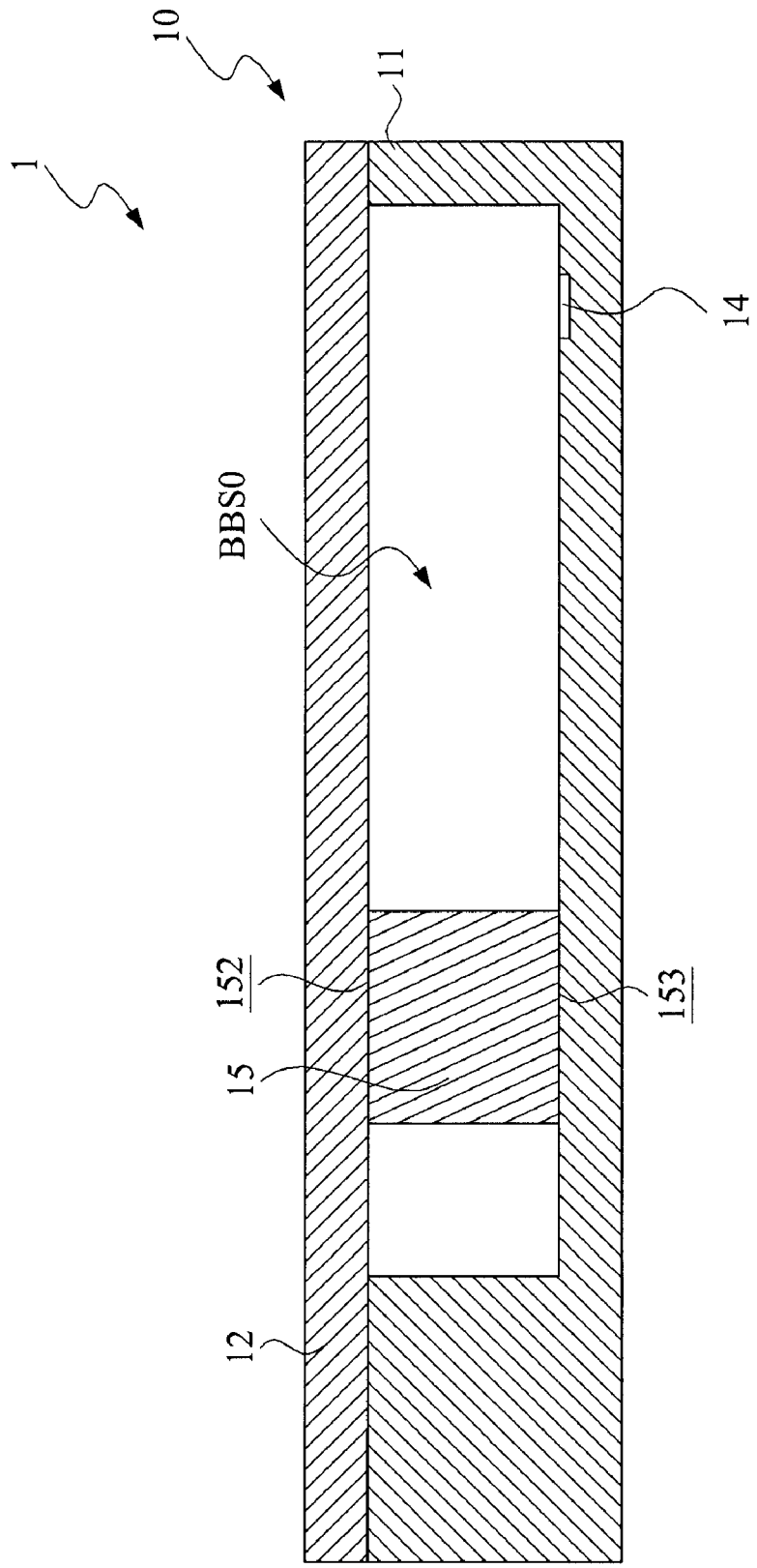
FIG. 2 is a sectional view along A-A direction in FIG. 1, which illustrates the optical sensing device with the second shell assembled to the first shell thereof.
Figure 3:
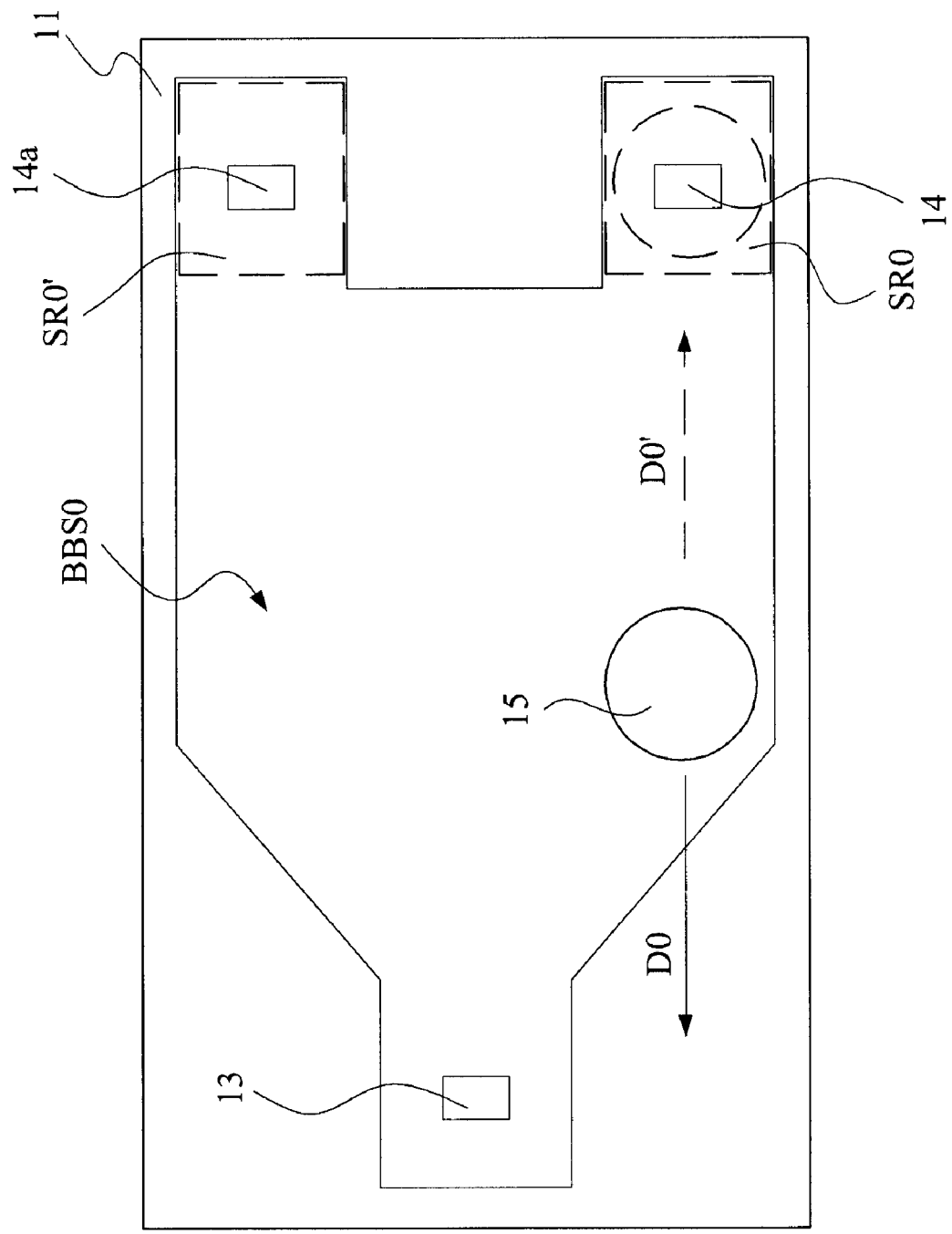
FIG. 3 illustrates the relative locations of the light emitting member, the shading member, the shading region and the optical sensing member in the first prior art.
Figure 4:
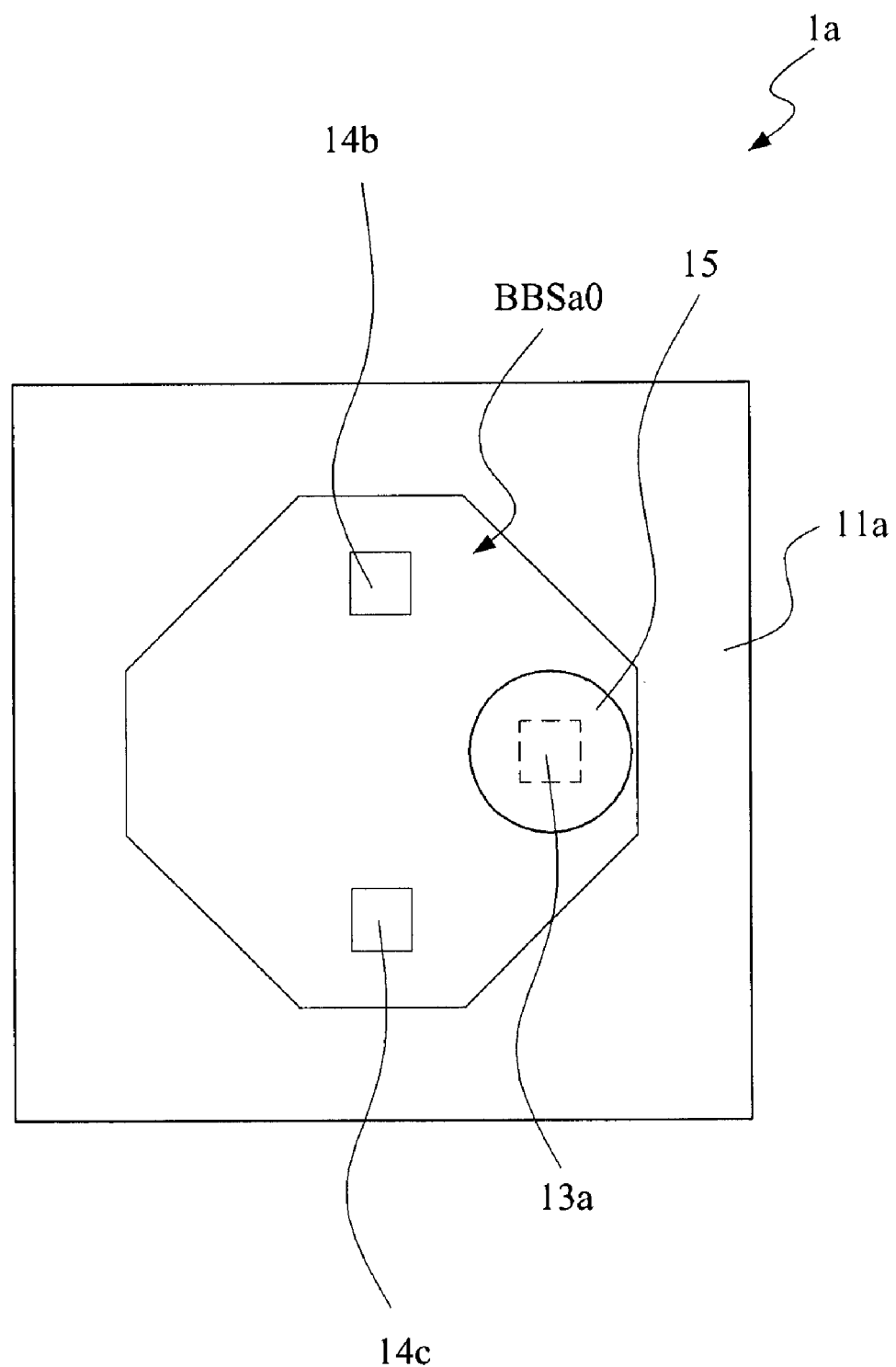
FIG. 4 illustrates the relative locations of the light emitting member, the shading member and the optical sensing member in a second prior art.
Figure 5:
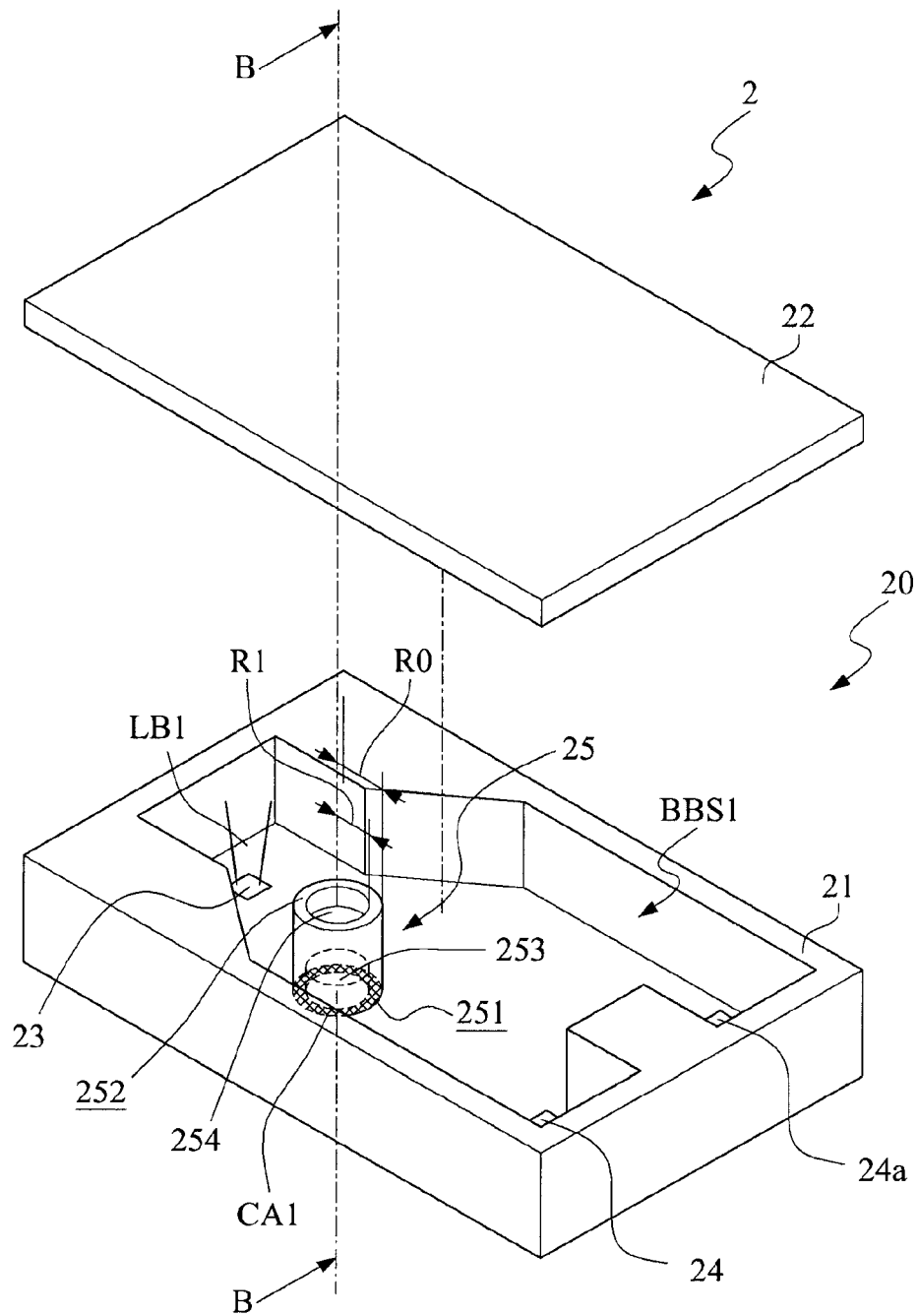
FIG. 5 illustrates the structure of an optical sensing device after a second shell is removed from a first shell thereof in a first embodiment of the present invention.
Figure 6:
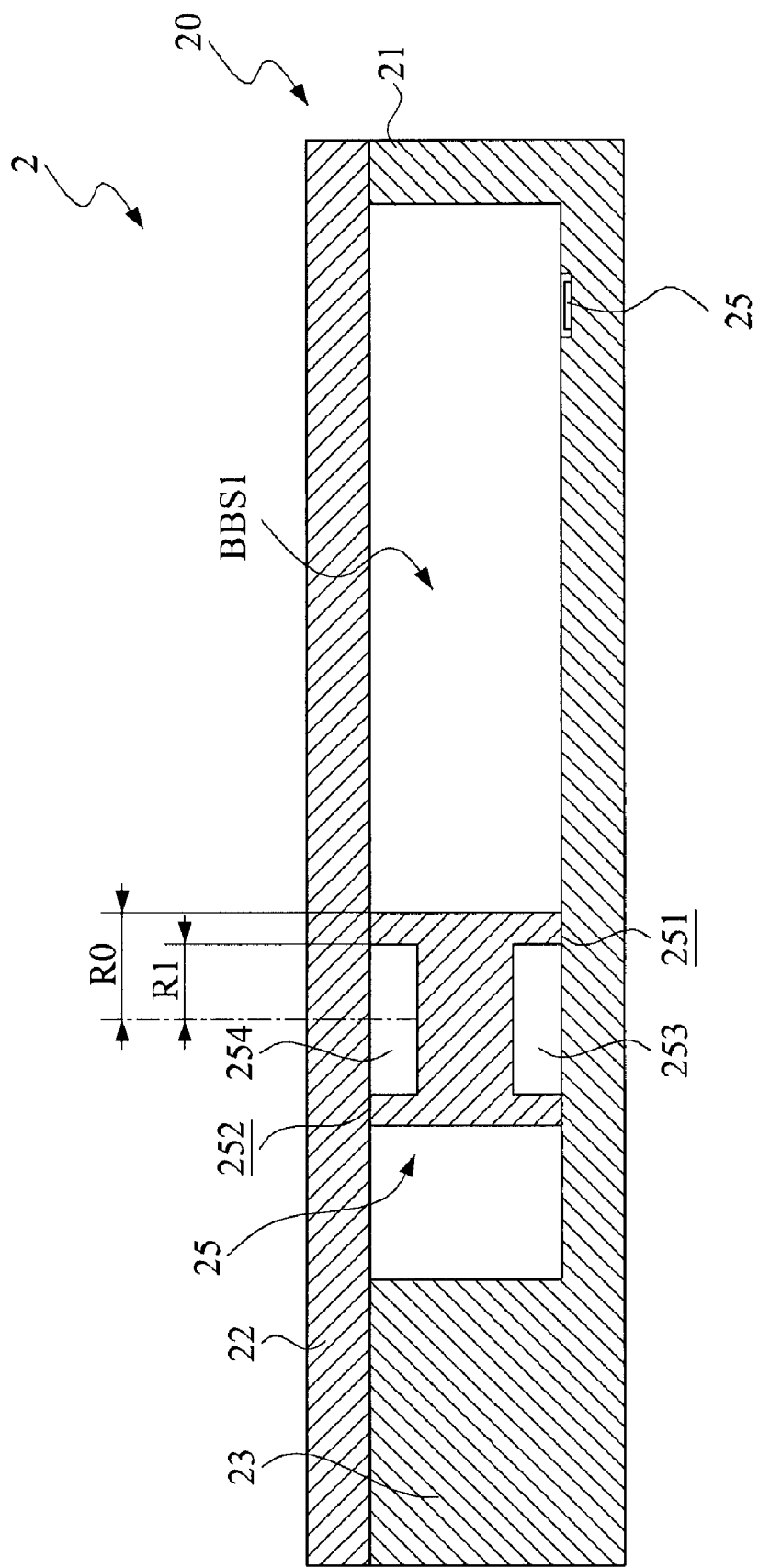
FIG. 6 is a sectional view along B-B direction in FIG. 5, which illustrates the optical sensing device with the second shell assembled to the first shell thereof.
Figure 7:
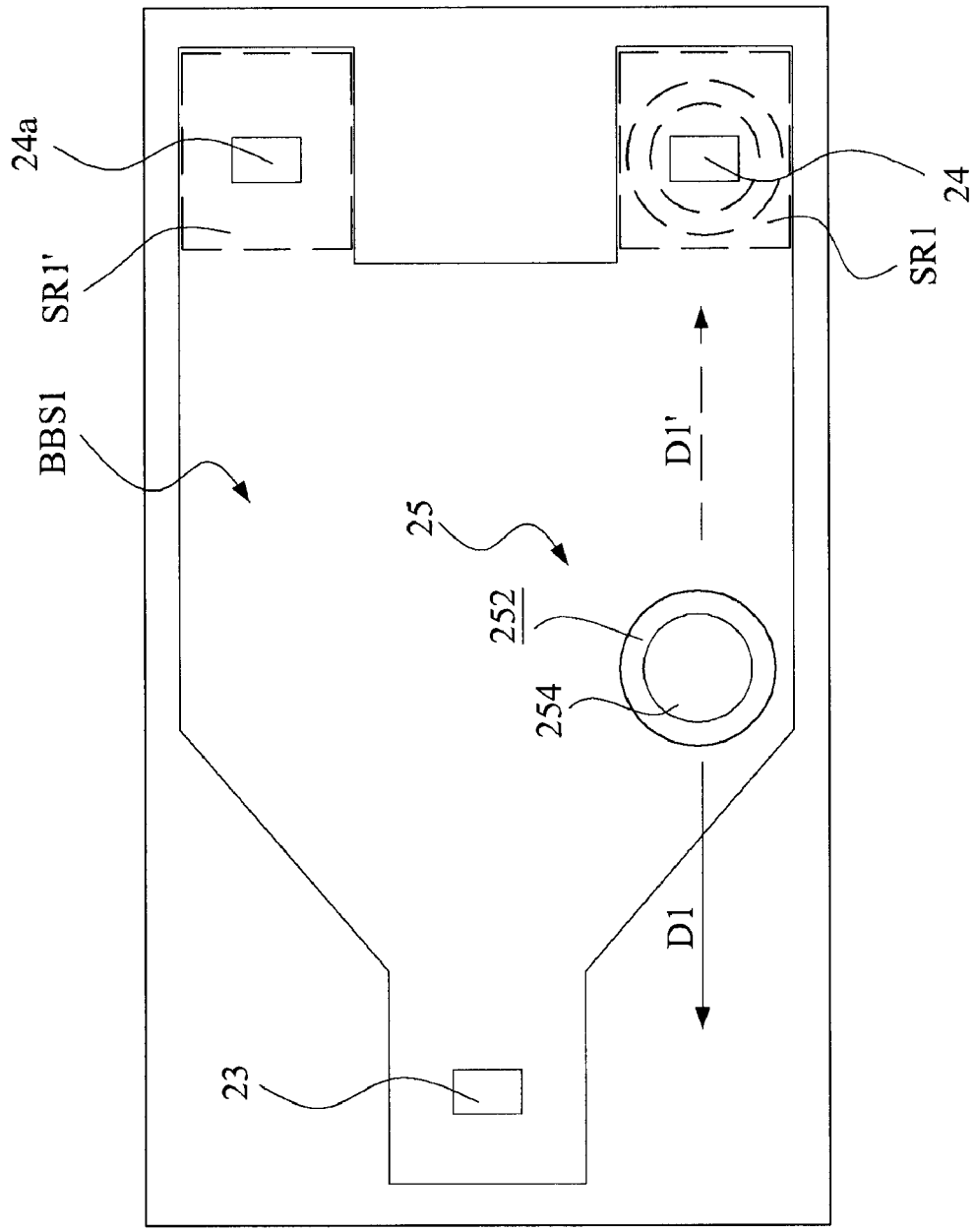
FIG. 7 illustrates the relative locations of the light emitting member, the shading member, the shading region and the optical sensing member in the first embodiment of the present invention.

Please refer to FIG. 5 to FIG. 7, wherein FIG. 5 illustrates the structure of an optical sensing device after a second shell is removed from a first shell thereof in a first embodiment of the present invention; FIG. 6 is a sectional view along B-B direction in FIG. 5, which illustrates the optical sensing device with the second shell assembled to the first shell thereof; and FIG. 7 illustrates the relative locations of the light emitting member, the shading member, the shading region and the optical sensing member in the first embodiment of the present invention. As shown in FIG. 5 and FIG. 6, an optical sensing device 2 comprises a shell 20 including a first shell 21 and a second shell 22, and the shell 20 is formed by assembling the second shell 22 to the first shell 21. Meanwhile, the optical sensing device 2 further comprises a light emitting member 23, two optical sensing members 24, 24a and a shading member 25.

When the second shell 22 is assembled to the first shell 21, a black-body condition space BBS1 is formed between the first shell 21 and the second shell 22. In other words, the shell 20 has the black-body condition space BBS1 therein. The optical sensing member 24 and 24a are arranged on the bottom of the first shell 21 of the shell 20. The shading member 25 is movably arranged within black-body condition space BBS1. Moreover, the shading member 25 is a substantial cylindrical structure, which has the first radius R0 as mentioned in the first prior art and two end surfaces 251 and 252. The end surface 251 contacts with the first shell 21 of the shell 20, and the second end surface 252 contacts with the second shell 22 of the shell 20. Additionally, a recess being a pillar shape recess 253 herein is formed on the end surface 251; and another recess being a pillar shape recess 254 herein is formed on the end surface 252.

In the first embodiment of the present invention, the pillar shape recesses 253 and 254 are particularly implied as cylindrical recesses; the light emitting member 23 can be a light emitting diode (LED); and the optical sensing members 24 and 24a can be photo transistors or photo diodes.

From FIG. 5, it can be known that the region that the end surface contacts with the first shell 21 is a ring shape region. The outer radius of the ring shape region is the first radius R0, and the inner radius of the ring shape region is a second radius R1 less than the first radius R0. Therefore, The end surface 251 contacts with the first shell 21 in a contact area CA1 of $\pi \cdot (R0^2 - R1^2)$, wherein $\pi$ is the ratio of the circumference of the substantial cylindrical structure to its diameter.

When the optical sensing device 2 is applied to sense the inclined angle or the movement data of an object (not shown), it is able to attach the optical sensing device 2 to the object, and make the light emitting member 23 project a light beam LB1 into the black-body condition space BBS1. The light beam LB1 is reflected by the first shell 21, the second shell 22 or the shading member 25 within the black-body condition space for at least one time, so as to illuminate the black-body condition space BBS1.

As shown in FIG. 7, when the object is moved or lifted along a first direction D1. The shading member 25 would surfer an inertia force or a gravity force. When the component of the inertia force or the gravity force along the surface, that the end surface 251 substantially contacts with the first shell 21, is greater than the friction force between the shading member 25 and the first shell 21, the shading member 25 would move along a second direction D1' opposite to the first direction D1.

When the shading member moves to a shading region SR1 within the black-body condition space BBS1, the optical sensing member 24 is partially or fully shaded by the shading member 25, so as to accordingly send out a low-intensity sensing signal. At this moment, in another shading region SR1', the optical sensing member 24a is not shaded by the shading member 25; therefore, the optical sensing member 24a still can sense the light beam LB1 to accordingly send out a sensing signal, and the sensing signal is a high-intensity sensing signal, which implies the intensity of light beam LB1 that the optical sensing member 24a senses is greater than the intensity of light beam LB1 that the optical sensing member 24 senses. Furthermore, the optical sensing member 24 would not be shaded by the shading member 25 when the shading member 25 moves out of the shading region SR1. At this moment, the optical sensing member 24 also can sense the light beam LB1 to accordingly send out the high-intensity sensing signal.

In practice, the high-intensity/low-intensity sensing signal not only can be applied to judge the movement data or the inclined angle of the object, but also can accordingly send a control signal to execute a feedback control or another general control for the object or other systems. For example, the control signal can be applied to control the movement of the inclined angle of the object, or be applied to control other working systems.

Figure 8:
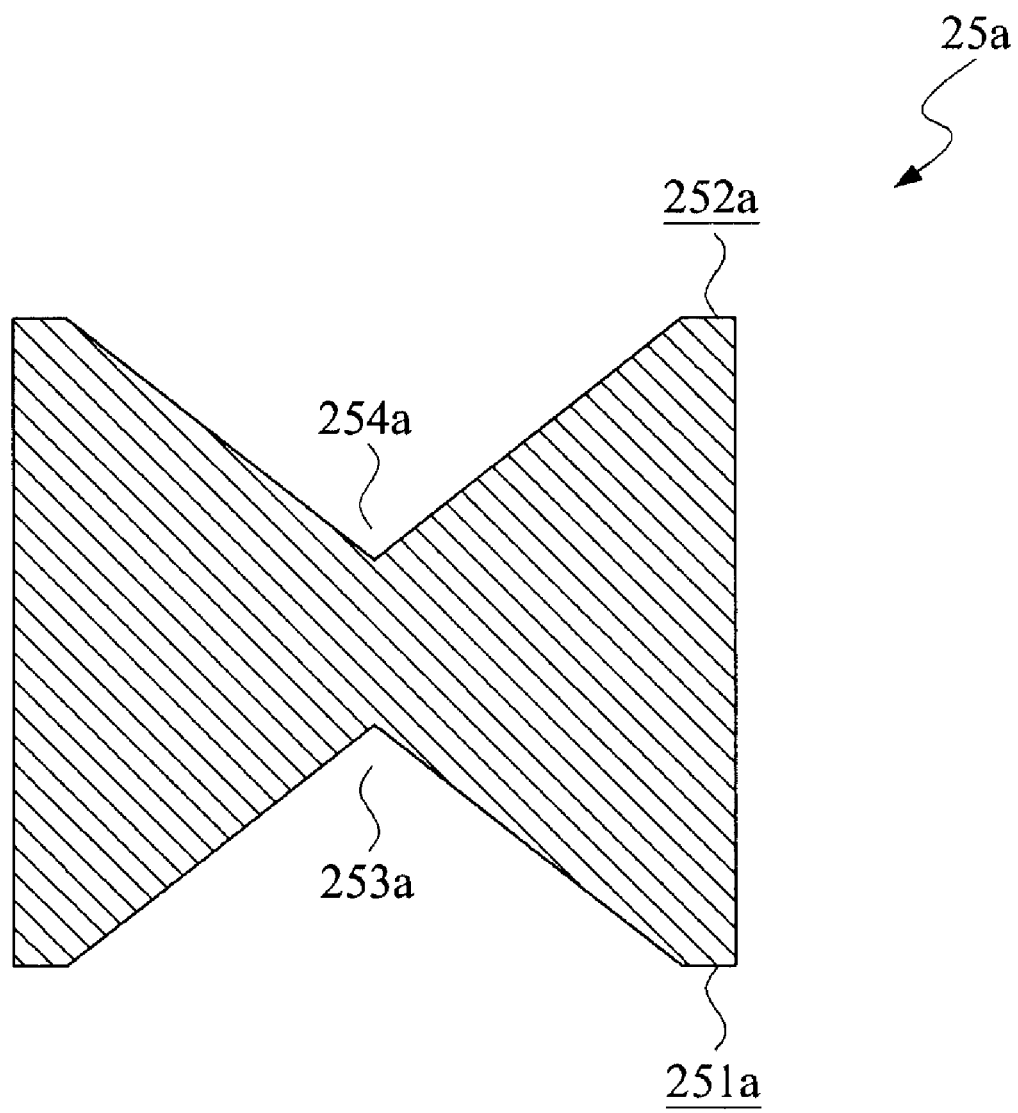
FIG. 8 illustrates the structure of another shading member in a second embodiment of the present invention.

Please refer to FIG. 8, which illustrates the structure of another shading member in a second embodiment of the present invention. As shown in FIG. 8, in the second embodiment, anther shading member 25a is applied to replace the shading member 25 of the first embodiment. The shading member 25a has two end surfaces 251a and 252a. With difference from the shading member 25, the end surface 251a is formed with a cone shape recess 253a, and the end surface 252a is formed with another cone shape recess 254a.

Figure 9:
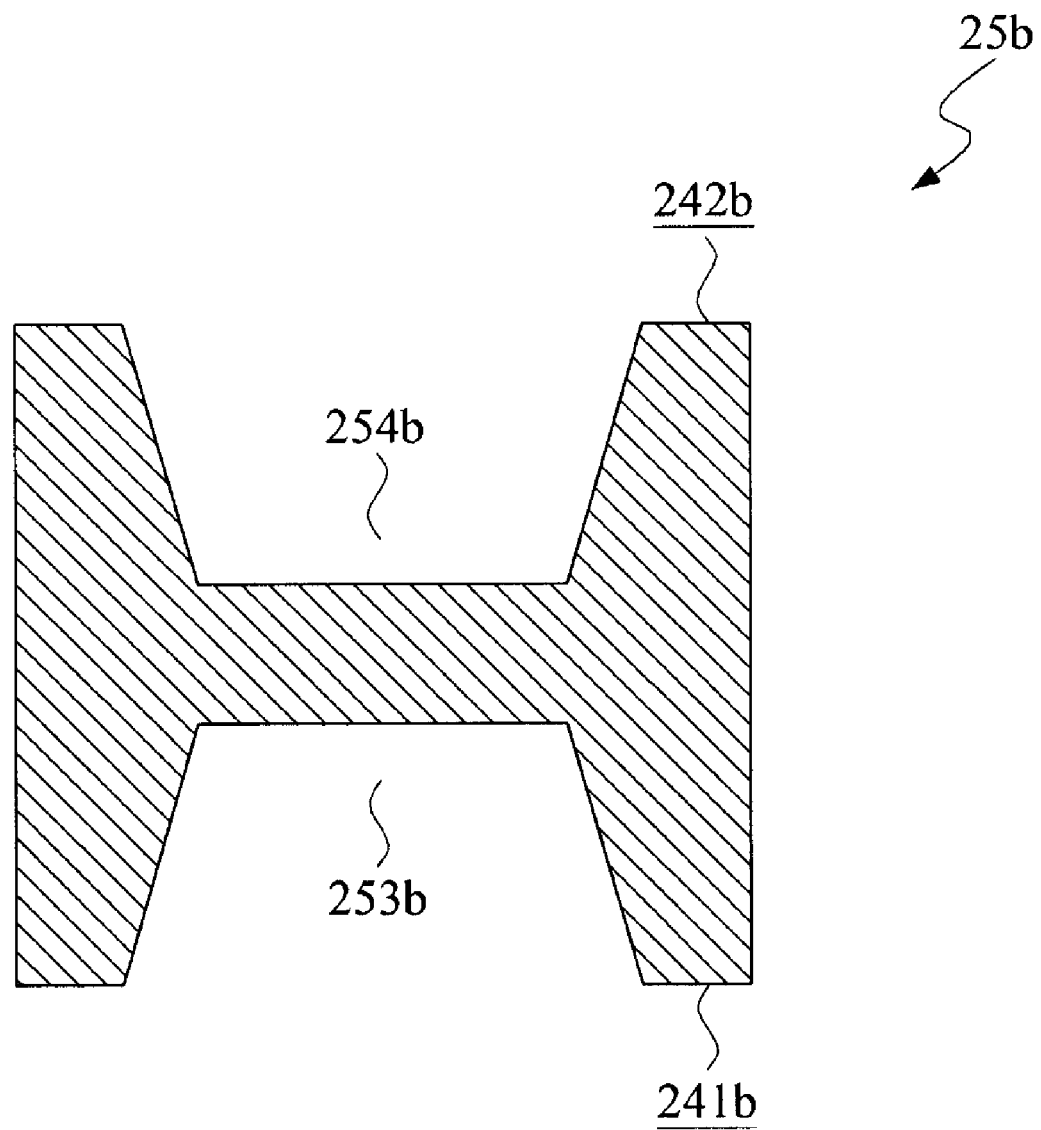
FIG. 9 illustrates the structure of another shading member in a third embodiment of the present invention.

Please refer to FIG. 9, which illustrates the structure of another shading member in third embodiment of the present invention. As shown in FIG. 9, in the third embodiment, anther shading member 25b is applied to replace the shading member 25 of the first embodiment. The shading member 25b has two end surfaces 251b and 252b. With difference from the shading member 25, the end surface 251b is formed with a cup shape recess 253b, and the end surface 252b is formed with another cup shape recess 254b.

Figure 10:
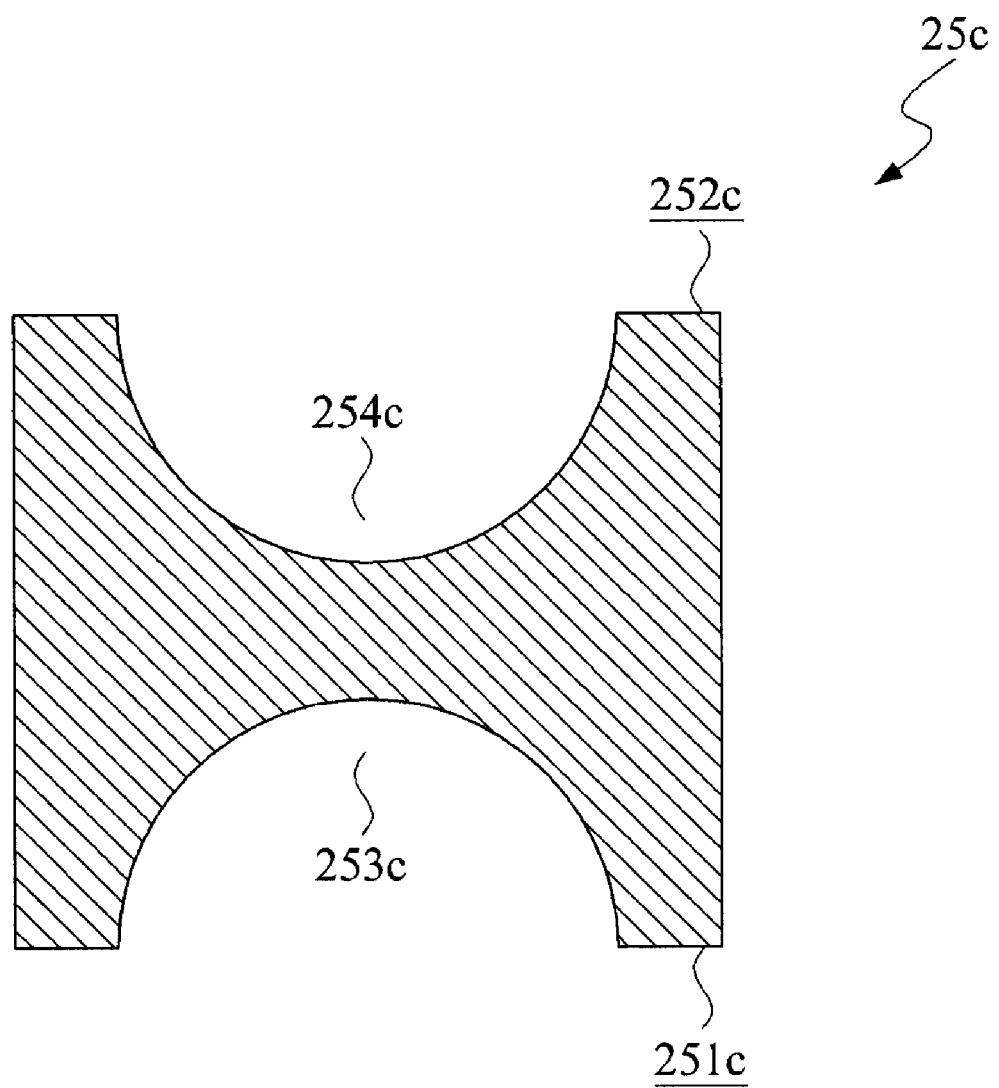
FIG. 10 illustrates the structure of another shading member in a fourth embodiment of the present invention.

Please refer to FIG. 10, which illustrates the structure of another shading member in fourth embodiment of the present invention. As shown in FIG. 10, in the fourth embodiment, anther shading member 25c is applied to replace the shading member 25 of the first embodiment. The shading member 25c has two end surfaces 251c and 252c. With difference from the shading member 25, the end surface 251c is formed with a curved shape recess 253c, and the end surface 252c is formed with another curved shape recess 254c.

Figure 11:
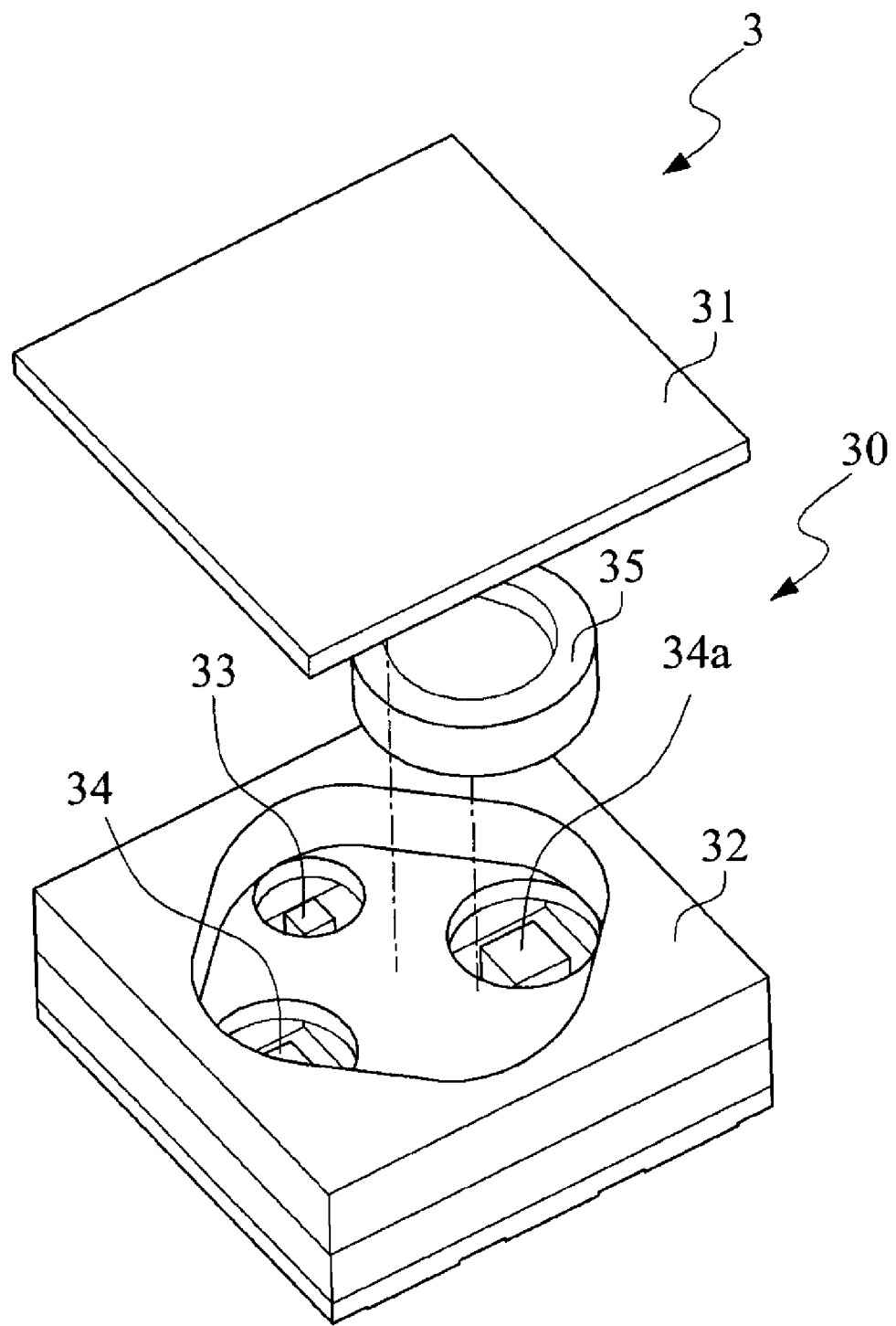
FIG. 11 illustrates the structure of an optical sensing device after a second shell is removed from a first shell thereof in a fifth embodiment of the present invention.
Figure 12:
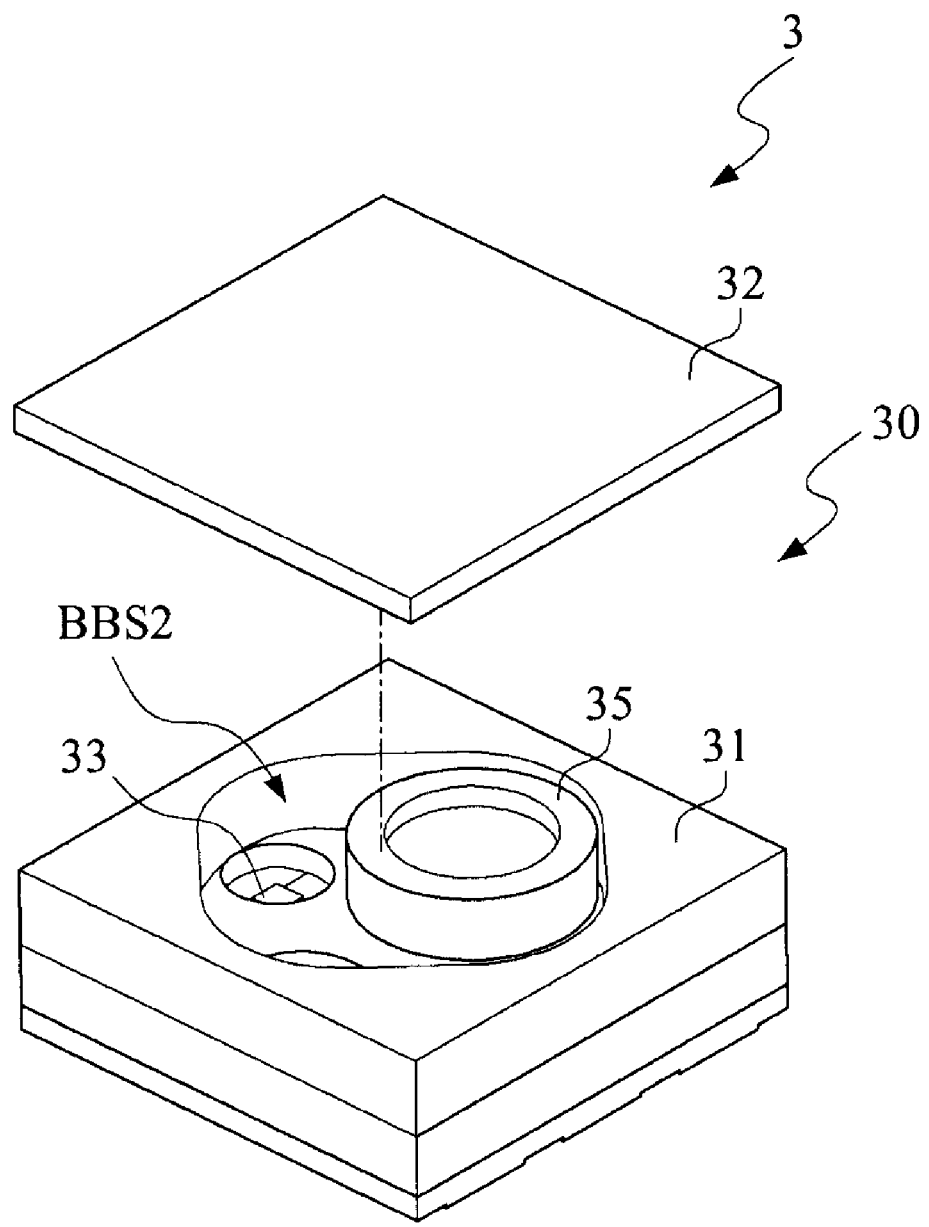
FIG. 12 illustrates the structure of an optical sensing device after a shading member is arranged within a black-body condition space thereof.

Please refer to FIG. 11 and FIG. 12, wherein FIG. 11 illustrates the structure of an optical sensing device after a second shell is removed from a first shell thereof in a fifth embodiment of the present invention; and FIG. 12 illustrates the structure of an optical sensing device after a shading member is arranged within a black-body condition space thereof.

As shown in FIG. 11 and FIG. 12, an optical sensing device 3 comprises a shell 30 including a first shell 31 and a second shell 32, and the shell 30 is formed by assembling the second shell 32 to the first shell 31. Meanwhile, the optical sensing device 3 further comprises a light emitting member 33, two optical sensing members 34, 34a and a shading member 35. With the main difference from the optical sensing device 2, the shell 30 is formed with a square-alike shape appearance with a rhombus-alike shape black-body condition space BBS2 therein. Besides, the light emitting member 33, the optical sensing members 34 and 34a are respectively arrange near three corners of the black-body condition space BBS2. Except for the main differences as mentioned, each element and its working principle in the fifth embodiment of the present invention are similar to or the same as those in the first embodiment of the present invention, the related statements would not be repeated respectively.

After reading the technologies as disclosed above, it is believable that any person skilled in ordinary art can realize that in the present invention, the contact area CA1 between the end surface 251 and the first shell 21 is $\pi \cdot (R0^2 - R1^2)$; therefore, with respect to the contact area CA0 of $\pi \cdot R0^2$ in the prior art, the contact area CA1 is obviously less than the contact area CA0, so that the friction force between the shading member 25 and the first shell 21 is less than the friction force between the shading member 15 and the first shell 11. Due to this reason, even the movement or inclined angle of the object is less, the inertia force or the gravity force is still sufficient to overcome the friction force to make the shading member 25 move with respect to the shell 21. In the other words, the optical sensing device 2 can effectively sense more slight movement or inclined angle deviation of the object, and it means that the sensitivity of the optical sensing device 2 for the sensing movement data and inclined angle of the object can be greatly improved It is further believable that any person skilled in ordinary art can realize that in the present invention, due to the contact area CA0 of $\pi \cdot (R0^2 - R1^2)$ is highly related to the friction between shading member 25 and the first shell 21; therefore, when the first radius R0 is a fixed value, it is able to adjust the second radius R1 to adjust the contact area CA1, so as to accordingly adjust the sensitivity for sensing the movement data or inclined angle of the object.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical sensing device, comprising:
   a shell formed with a black-body condition space therein;
   at least one light emitting member projecting at least one light beam into the black-body condition space;
   at least one optical sensing member located within the shell and neighboring to the black-body condition space; and
   a shading member movably arranged within the black-body condition space, having at least one end surface contacted with the shell, and formed with at least one recess;

wherein when the shading member moves to at least one shading region within the black-body condition space, the optical shading member is shaded by the shading member; and when the shading member moves out of the shading region, the shading member senses the light beam to accordingly send out a sensing signal.

2. The optical sensing device as claimed in claim 1, wherein light beam is sensed by the optical sensing member after being reflected by the shell for at least one time.

3. The optical sensing device as claimed in claim 1, wherein light beam is sensed by the optical sensing member after being reflected by the shading member for at least one time.

4. The optical sensing device as claimed in claim 1, wherein the sensing signal is a high-intensity sensing signal.

5. The optical sensing device as claimed in claim 1, wherein when the optical shading member is shaded by the shading member, a low-intensity sensing signal.

6. The optical sensing device as claimed in claim 1, wherein the recess is a cylindrical shape recess.

7. The optical sensing device as claimed in claim 1, wherein the recess is a cone shape recess.

8. The optical sensing device as claimed in claim 1, wherein the recess is a cup shape recess.

9. The optical sensing device as claimed in claim 1, wherein the recess is a curved shape recess.

10. The optical sensing device as claimed in claim 1, wherein the light emitting member is a light emitting diode (LED).

11. The optical sensing device as claimed in claim 1, wherein the optical sensing member is photo transistor.

12. The optical sensing device as claimed in claim 1, wherein the optical sensing member is photo diode.

13. The optical sensing device as claimed in claim 1, wherein the shell is formed by assembling a first shell to a second shell thereof.

14. The optical sensing device as claimed in claim 1, wherein the shading member is a substantial cylindrical structure.

* * * * *